United States Patent
Qiao et al.

(10) Patent No.: US 10,470,100 B2
(45) Date of Patent: Nov. 5, 2019

(54) NODE EQUIPMENT, DATA PACKET FORWARDING METHOD AND MESH NETWORK SYSTEM THEREOF

(71) Applicant: Silergy Semiconductor Technology (Hangzhou) LTD, Hangzhou, ZheJiang Province (CN)

(72) Inventors: Junjie Qiao, Hangzhou (CN); Linyan Liu, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 187 days.

(21) Appl. No.: 15/644,445

(22) Filed: Jul. 7, 2017

(65) Prior Publication Data
US 2018/0027472 A1  Jan. 25, 2018

(30) Foreign Application Priority Data

Jul. 20, 2016 (CN) .......................... 2016 1 0584808

(51) Int. Cl.
*H04W 40/20* (2009.01)
*H04L 27/00* (2006.01)
*H04L 29/06* (2006.01)
*H04W 4/06* (2009.01)
*H04L 29/08* (2006.01)
*H04L 12/733* (2013.01)
*H04W 84/18* (2009.01)

(52) U.S. Cl.
CPC ......... *H04W 40/20* (2013.01); *H04L 27/0008* (2013.01); *H04L 69/08* (2013.01); *H04L 69/323* (2013.01); *H04W 4/06* (2013.01); *H04L 45/122* (2013.01); *H04W 84/18* (2013.01)

(58) Field of Classification Search
CPC ....... H04W 40/20; H04W 4/06; H04W 84/18; H04L 27/0008; H04L 45/122; H04L 69/08
See application file for complete search history.

(56) References Cited

U.S. PATENT DOCUMENTS

| | | | |
|---|---|---|---|
| 7,864,682 B2 | 1/2011 | Appaji et al. | |
| 8,385,345 B2 | 2/2013 | Ji et al. | |
| 8,391,255 B2 | 3/2013 | Ribiere et al. | |
| 2012/0274234 A1* | 11/2012 | Campbell | H05B 37/0245 315/294 |
| 2013/0201316 A1* | 8/2013 | Binder | H04L 67/12 348/77 |
| 2013/0346054 A1* | 12/2013 | Mumtaz | H02J 3/383 703/13 |

FOREIGN PATENT DOCUMENTS

| | | |
|---|---|---|
| CN | 105451165 A | 3/2016 |
| CN | 105681189 A | 6/2017 |

* cited by examiner

*Primary Examiner* — Mohammad S Anwar
(74) *Attorney, Agent, or Firm* — Michael C. Stephens, Jr.

(57) ABSTRACT

An apparatus can include: a network controller in a mesh network, and that transmits and receives first type data packets; node devices in the mesh network, each operable in a first or second mode; a node device being configured to convert at least part of the first type data packets to second type data packets, and to transmit the second type data packets, when the node device operates in the first mode; the node device being configured to convert at least part of the second type data packets to the first type data packets when the node device operates in the first mode; and the node device being configured to transmit and receive the second type data packets when the node device operates in the second mode.

20 Claims, 6 Drawing Sheets

NODE EQUIPMENT, DATA PACKET FORWARDING METHOD AND MESH NETWORK SYSTEM THEREOF

RELATED APPLICATIONS

This application claims the benefit of Chinese Patent Application No. 201610584808.8, filed on Jul. 20, 2016, which is incorporated herein by reference in its entirety.

FIELD OF THE INVENTION

The present invention generally relates to communication technology, and more particularly to node device, data packet forwarding methods, and mesh network systems.

BACKGROUND

With the development of IOT technology, more and more intelligent pieces of equipment are being connected to networks. Mesh networks have garnered increasing attention due to its dynamic extensibility, higher connectivity, higher reliability, and higher stability, as compared to other approaches. Intelligent equipment as terminals may initially be connected to a mesh network, and then can be connected to other networks of the same or different types, in order to achieve remote management, timing control, parameter regulation, and other functions.

DETAILED DESCRIPTION

Figure 1:
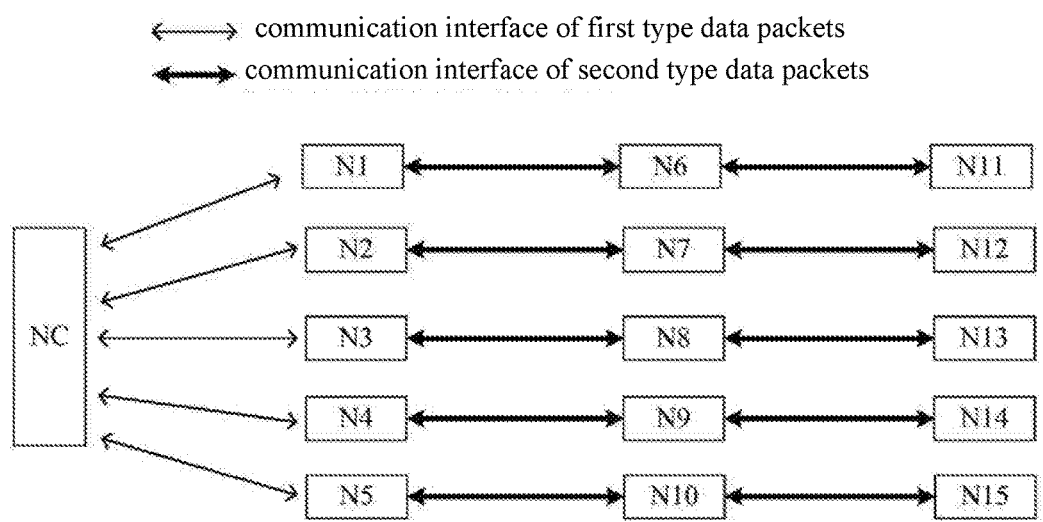
FIG. 1 is a schematic block diagram of an example network topology of a mesh network system, in accordance with embodiments of the present invention.

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Mesh networks can be configured as a network architecture including one or more network controllers and a plurality of node devices. The network controller can achieve communication scheduling between node devices, and communication routing between node devices and an external network. The node device/equipment can access an external network through the network controller. In addition, only one network controller is typically employed to control the network. In some approaches, the mesh network can be achieved by broadcasting communications using various communication protocols (e.g., Bluetooth protocol 4.0, low power Bluetooth protocol, etc.).

In a mesh network, which may be different from a relatively long and direct connection, data may be forwarded through an adjacent node device in a multi-hop communication. The data transmission can occur by transmitting received data packets through a node device. The node device may be configured as a repeater in order to achieve information transmission. In the network, the data transmission of a node device can occur by a random delay. However, due to the limitation (e.g., about 20 m) of wireless transmitting distance of the mesh network, when the distance of one hop is too great, the communication between node devices may be abnormal, or may otherwise be easily disturbed. Therefore, improved data communication control method of a mesh network can improve the stability of the mesh network. In particular embodiments, a mesh network of multiple hops can utilize any suitable communication protocol (e.g., WLAN, ZigBee, Bluetooth technologies, low power consumption Bluetooth protocols, etc.).

In one embodiment, an apparatus can include: (i) a network controller in a mesh network, and being configured to transmit and receive first type data packets; (ii) a plurality of node devices in the mesh network, where each node device is configured to operate in a first mode or a second mode; (iii) a node device of the plurality of node devices being configured to convert at least part of the first type data packets to second type data packets, and to then transmit the second type data packets, when the node device operates in the first mode; (iv) the node device being configured to convert at least part of the second type data packets to the first type data packets when the node device operates in the first mode; and (v) the node device being configured to transmit and receive the second type data packets when the node device operates in the second mode, where the first type data packets are configured as data packets of a predetermined physical layer protocol, and where the second type data packets are configured as data packets with an enhanced physical layer performance.

Referring now to FIG. 1, shown is a schematic block diagram of an example network topology of a mesh network system, in accordance with embodiments of the present invention. In this particular example, the mesh network system can include network controller NC and a plurality of node devices N1-N15. Network controller NC can be configured as a mobile phone, desktop computer, tablet computer, and/or other intelligent terminal, or may be a dedicated network controller. The node device can be configured as an intelligent appliance (e.g., IOT) or other intelligent device or piece of equipment (e.g., television, refrigerator, water heater, LED lighting lamp, camera, monitor, outlet, timer, etc.) that can be connected to the network.

The particular example mesh network of FIG. 1 is a single path network. A plurality of signal paths can be formed with network controller NC as the center. Each signal path can include a plurality of node device coupled in series, and the node devices of different signal paths may not be connected to each other. With network controller NC as the center, node devices N1, N6, and N11 can be arranged in sequence on a first signal path, node devices N2, N7, and N12 can be arranged in sequence on a second signal path, node devices N3, N8, and N13 can be arranged in sequence on a third signal path, node devices N4, N9, and N14 can be arranged in sequence on a fourth signal path, and node devices N5, N10, and N15 can be arranged in sequence on a fifth signal path. The first to fifth signal paths may all be connected to network controller NC, and there may be no connections between any two different signal paths. A data packet can only be forwarded between two adjacent node devices on a same signal path. Each node device can be configured to only transmit a data packet to an adjacent node device or network controller. For example, node device N9 can transmit a data packet to adjacent node devices N4 and N14 on the fourth signal path.

The communication between network controller NC and an external network can be achieved by any suitable protocol (e.g., WLAN, ZigBee, Bluetooth, etc.). In addition, the communication between network controller NC and a node device, and between two adjacent node devices can be achieved by any suitable protocol (e.g., WLAN, ZigBee, Bluetooth, etc.). For example, a low energy Bluetooth protocol can be employed. Network controller NC can control data communication in the mesh network, and may also provide routing between the mesh network system and an external network. Therefore, a node device of the mesh network system can access an external network through network controller NC.

In one mesh network system, the data packets can be transferred between node devices, and between a node device and network controller NC in accordance with a standard communication interface. However, such a standard communication interface may have disadvantages of limited communication distance, as well as instability that may be caused by interference. The communication performance between node devices can significantly be decreased when there are barriers (e.g., walls) between node devices, and this can be more severe when a node device is configured as Bluetooth low energy (BLE) equipment. In particular embodiments, the node device can be configured to achieve communication by a standard BLE protocol. Also in particular embodiments, the node device can transmit and receive data packets whereby the physical layer performance is enhanced (e.g., stronger anti-interference ability, longer transmission distance, lower power losses, etc.) when passing through barriers, in order to improve the stability of the mesh network/system.

For example, each node device can be operable in a first mode or in a second mode. In the first mode (e.g., standard BLE protocol), the node device can process at least part of the received data packets in order to generate data packets with enhanced protocol layer performance, and to transmit the data packets with enhanced protocol layer performance to an adjacent node device. In the second mode, the node device may transmit and receive data packets with the enhanced protocol layer performance. In the first mode, at least part of the received first type data packets can be converted to second type data packets by the node device, and then the second type data packets may be transmitted by the node device. In the second mode, the node device can transmit and receive the second type data packets.

For example, the first type data packet can be a data packet in accordance with a predetermined physical layer protocol, and the second type data packet can be data packet with an enhanced physical layer protocol. Therefore, better communication performance between node devices can be achieved by a physical layer protocol having enhanced performance, as compared to other approaches. Because data packets can also be transmitted between node devices in accordance with the BLE standard protocol, other devices on a mesh network (e.g., network controller NC) can be compatible with other node devices. For example, network controller NC can be standard equipment (e.g., a mobile phone, computer, etc.).

In one embodiment, a node device configured in a mesh network, can include: (i) a multimode transceiver configured to transmit and receive first type data packets and second type data packets; (ii) a controller configured to convert at least part of received first type data packets to the second type data packets that are then transmitted by the multimode transceiver, and being configured to convert at least part of received second type data packets to the first type data packets that are then transmitted by the multimode transceiver in a first mode, where the controller is configured to control the multimode transceiver to transmit and receive the second type data packets in a second mode; and (iii) where the first type data packets are configured as data packets of a predetermined physical layer protocol, and the second type data packets are configured as data packets with enhanced physical layer performance.

Figure 2A:
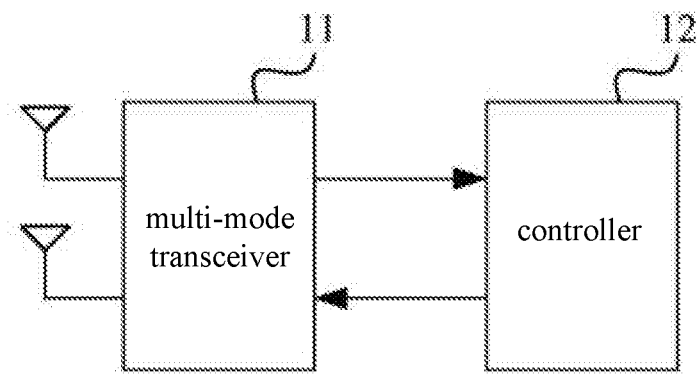
FIG. 2A is a structure diagram of an example node device, in accordance with embodiments of the present invention.

Referring now to FIG. 2A, shown is a structure diagram of an example node device, in accordance with embodiments of the present invention. This particular example node device can include multi-mode transceiver 11 and controller 12. Multi-mode transceiver 11 can transmit and receive data packets in accordance with the standard BLE protocol, and data packets with enhanced physical layer performance. Controller 12 can convert at least part of the received data packets to data packets of a different type in the first mode. If the node device is not the end destination of the data packets, the data packets of the different type can be transmitted by multi-mode transceiver 11. In the second mode, controller 12 can control multi-mode transceiver 11 to transmit and receive the second type data packets with enhanced physical layer performance.

The modulation modes can significantly influence the signal transmission performance. For example, the modulation mode of standard BLE physical layer is 1 Mbps GFSK, and the transmission distance may be within 20 m. To improve the physical layer performance, as compared with above modulation mode, modulation modes with lower receiving sensitivity, lower rate, and/or employment of spread spectrum technology may be employed (e.g., 1 Mbps BPSK, 250 KHz GFSK, spread spectrum GFSK, spread spectrum BPSK, and spread spectrum QPSK modulations, etc.).

When network controller NC is configured as standard BLE equipment, only the node device adjacent to network controller NC may operate in the first mode, and other node devices can operate in the second modes. Node devices N1-N5 of FIG. 1 can operate in the first mode to convert received data packets from one modulation mode to another modulation mode that is then to be transmitted. Node devices N6-N15 can operate in the second mode, and the previous and next hop node devices may both receive and transmit data packets with enhanced physical layer performance. Therefore, improved communication performance and stability can be achieved by transmitting and receiving data packets with enhanced physical layer performance between the previous and next hop node devices.

The communication protocol between node devices N1-N5 and network controller NC may be a BLE standard protocol, and the communication protocol between two adjacent node devices of node devices N6-N10 can be a physical layer protocol with enhanced performance (e.g., protocol with enhanced modulation mode). When networking, the operation mode of each node device can be determined in accordance with various requirements. Optionally, the operation mode of each node device can be determined in accordance with the relative position of that node device in the mesh network system during the networking or the operation of the mesh network.

The relative position of the node device can be determined in accordance with the hops of the minimum forwarding path or forwarding number (e.g., the number of node devices of the transmission path) between a node device and network controller NC. Based on the relative position, the node device can learn the number of node devices or hops, in order to achieve communication with network controller NC. If all node devices of the mesh network are configured to be able to achieve communication through protocols of standard BLE and enhanced physical layer, the node device adjacent to network controller NC can operate in the first mode, and the other node devices can operate in the second mode.

Various approaches can be employed in order to determine the relative position of a node device in a signal path. When initiating network controller NC, or updating network topology to generate command data packets transmitted in a broadcast mode, the node device may be configured to forward the command data packets. For example, the relative position can be determined in accordance with the minimum forwarding number when the command data packets are received. Optionally, the operation in the first mode or in the second mode can be determined in accordance with the state of an adjacent node device.

In one embodiment, a method of forwarding a data packet from a node device in a mesh network, can include: (i) in a first mode, converting at least part of received first type data packets to second type data packets; (ii) transmitting the second type data packets; (iii) converting at least part of received second type data packets to the first type data packets; (iv) transmitting the first type data packets; and (v) in a second mode, transmitting and receiving the second type data packets, where the first type data packets are configured as data packets of predetermined physical layer protocol, and the second type data packets are configured as data packets with enhanced physical layer performance.

Figure 2B:
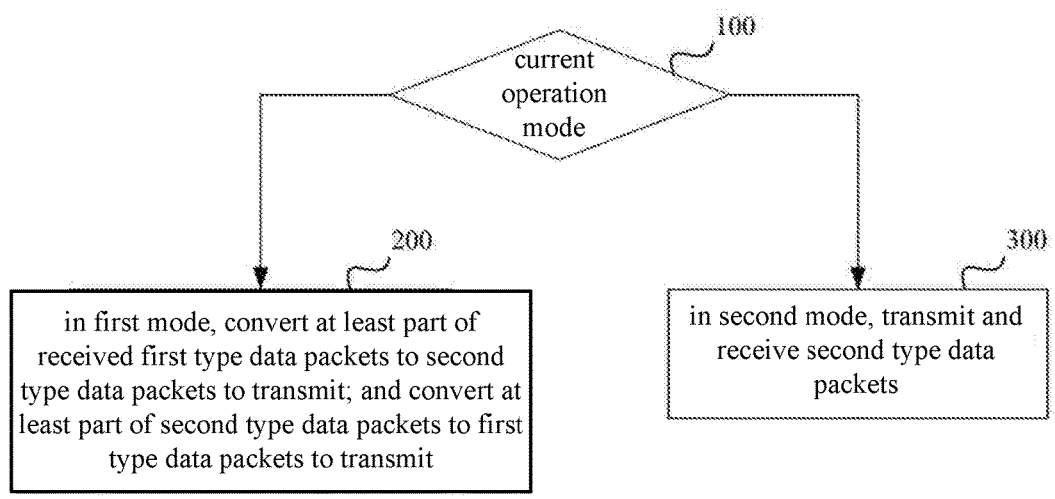
FIG. 2B is a flow diagram of an example data packet forwarding method of the node device, in accordance with embodiments of the present invention.

Referring now to FIG. 2B, shown is a flow diagram of an example data packet forwarding method of the node device, in accordance with embodiments of the present invention. In this particular example, at 100, whether the current operation mode is the first mode can be determined. If the operation mode is the first mode, the flow can proceed to 200, and if the operation mode is the second mode, the flow can proceed to 300. For example, the operation mode may be determined by the node device in accordance with the relative position, or by user arrangement. In 200, in the first mode, at least part of received first type data packets can be converted to second type data packets, and then the second type data packets may be transmitted. Further, at least part of the received second type data packets may be converted to first type data packets, and then the first type data packets can be transmitted. In 300, in the second mode, the second type data packets can be transmitted and/or received.

Figure 3:
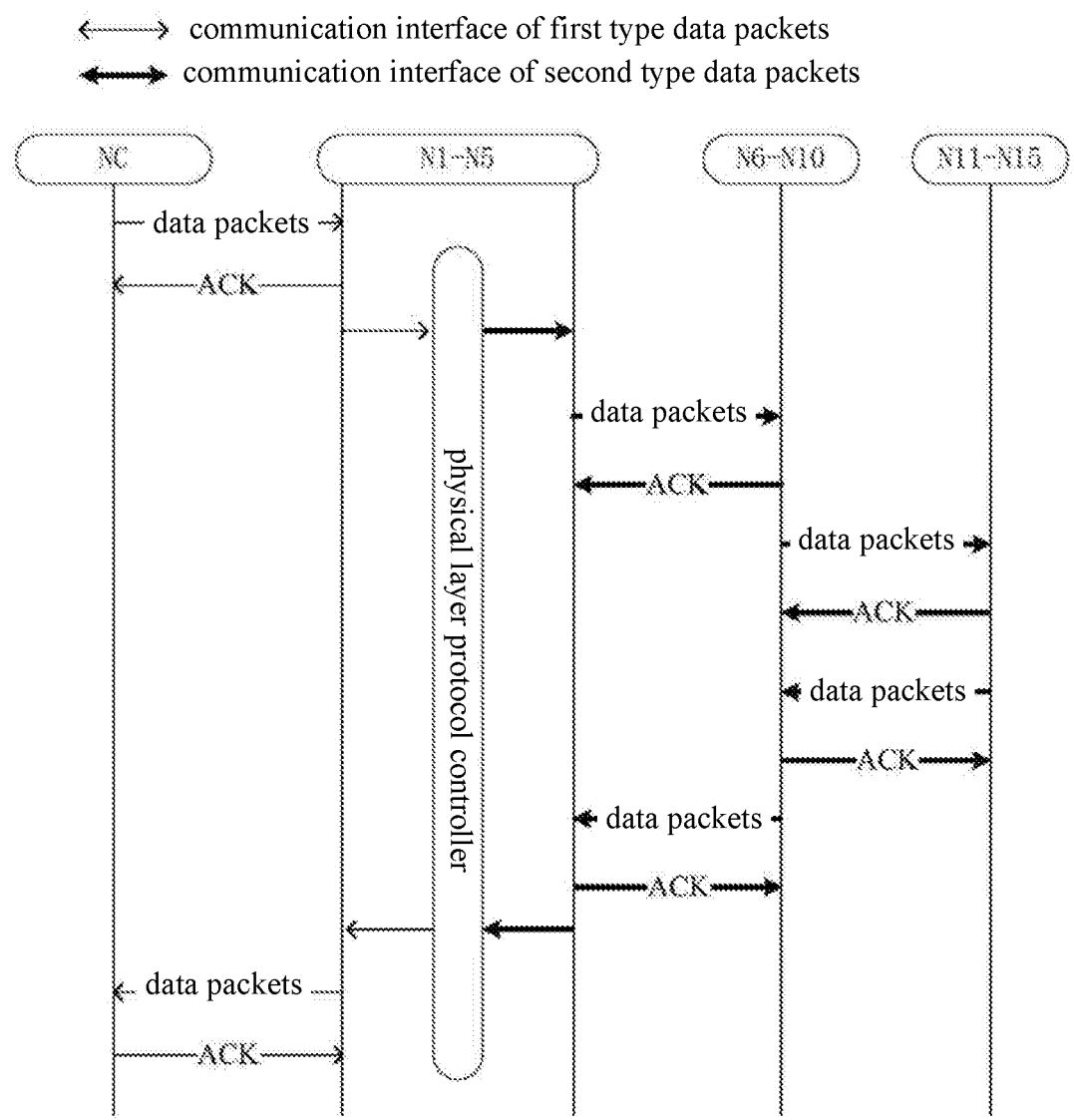
FIG. 3 is a flow diagram of an example data packet transmitting and receiving method of the mesh network system, in accordance with embodiments of the present invention.

Referring now to FIG. 3, shown is a flow diagram of an example data packet transmitting and receiving method of the mesh network system, in accordance with embodiments of the present invention. In this particular example, in the first hop communication, network controller NC can transmit first type data packets (e.g., 1 Mbps GFSK modulation) to node devices N1-N5. After receiving the first type data packets, data packets (e.g., 1 Mbps GFSK modulation) can be transmitted to network controller NC by node devices N1-N5. When network controller NC receives data packets (ACK), the communication of first type data packets between network controller NC and node devices N1-N5 may be completed.

When node devices N1-N5 operate in the first mode, the received first type data packets (e.g., 1 Mbps GFSK) can be converted to second type data packets (e.g., 1 Mbps BPSK or 250 Mbps GFSK) by a physical layer protocol controller of the node device, and then the second data packets may be transmitted to next hop node devices N6-N10. Node devices N6-N10 may operate in the second mode. After node devices N6-N10 receive the second type data packets, data packets ACK (e.g., 1 Mbps BPSK or 250 Mbps GFSK) can be transmitted to node devices N1-N5. When node devices N1-N5 receive data packets ACK, the communication of second type data packets can be completed.

Received second type data packets (e.g., 1 Mbps BPSK or 250 Mbps GFSK) can be transmitted by node devices N6-N10 to next hop node devices N11-N15. After receiving the second type data packets, data packets ACK may be transmitted to node devices N6-N10 from node devices N11-N15. The data packets of network controller can be broadcasted to all node devices of the mesh network, and may be processed by a specific one or more of such node devices.

When a node device is to transmit data packets to network controller NC, the data packets may be converted to second type data packets (e.g., 1 Mbps BPSK or 250 Mbps GFSK), and then the second type data packets can be transmitted to a corresponding one of next hop node devices N6-N10 by one of node devices N11-N15. After receiving the second type data packets, data packets ACK (e.g., 1 Mbps BPSK or 250 Mbps GFSK) can be transmitted to corresponding one of node devices N6-N10 from one of node devices N11-N15. When one of node devices N11-N15 receives data packets ACK, the transmitting and receiving data packets process may be completed.

The received second type data packets (e.g., 1 Mbps BPSK or 250 Mbps GFSK) may be transmitted to one of node devices N1-N5 of the next hop from one of node devices N6-N10. After receiving second type data packets, data packets ACK (e.g., second type data packets) may be transmitted to one of one of node devices N6-N10 from node devices N1-N5. When one of node devices N6-N10 receives data packets ACK, the transmitting and receiving data packets process can be completed.

Received second type data packets (e.g., 1 Mbps BPSK or 250 Mbps GFSK) can be converted to first type data packets (e.g., 1 Mbps GFSK) by a physical layer protocol controller of one of node devices N1-N5, and then the first type data packets may be transmitted to network controller NC. After receiving the first type data packets, data packets ACK (e.g., 1 Mbps GFSK) can be transmitted to one of node devices N1-N5 from network controller NC. When one of node devices N1-N5 receives data packets ACK, the communication of first type data packets can be completed. In this way, the data packets of all node devices can be transmitted to network controller NC through one or more hops.

Because the communication between node devices N1-N5 and node devices N6-N10, and communication between node devices N6-N10 and node devices N11-N15, can be achieved through data packets with enhanced physical layer performance, more stable communication connections and a larger communication range of the mesh network can be achieved in order to improve communication quality. In addition, because communication between node devices N1-N5 and network controller NC can be achieved through data packets of the standard BLE protocol, a standard network controller can be compatible with the mesh network. Furthermore, the data packets may not need be processed above the physical layer by a node device. Before modulation, the process of data packets can be consistent with standard BLE equipment, which can decrease design and equipment costs.

Figure 4:
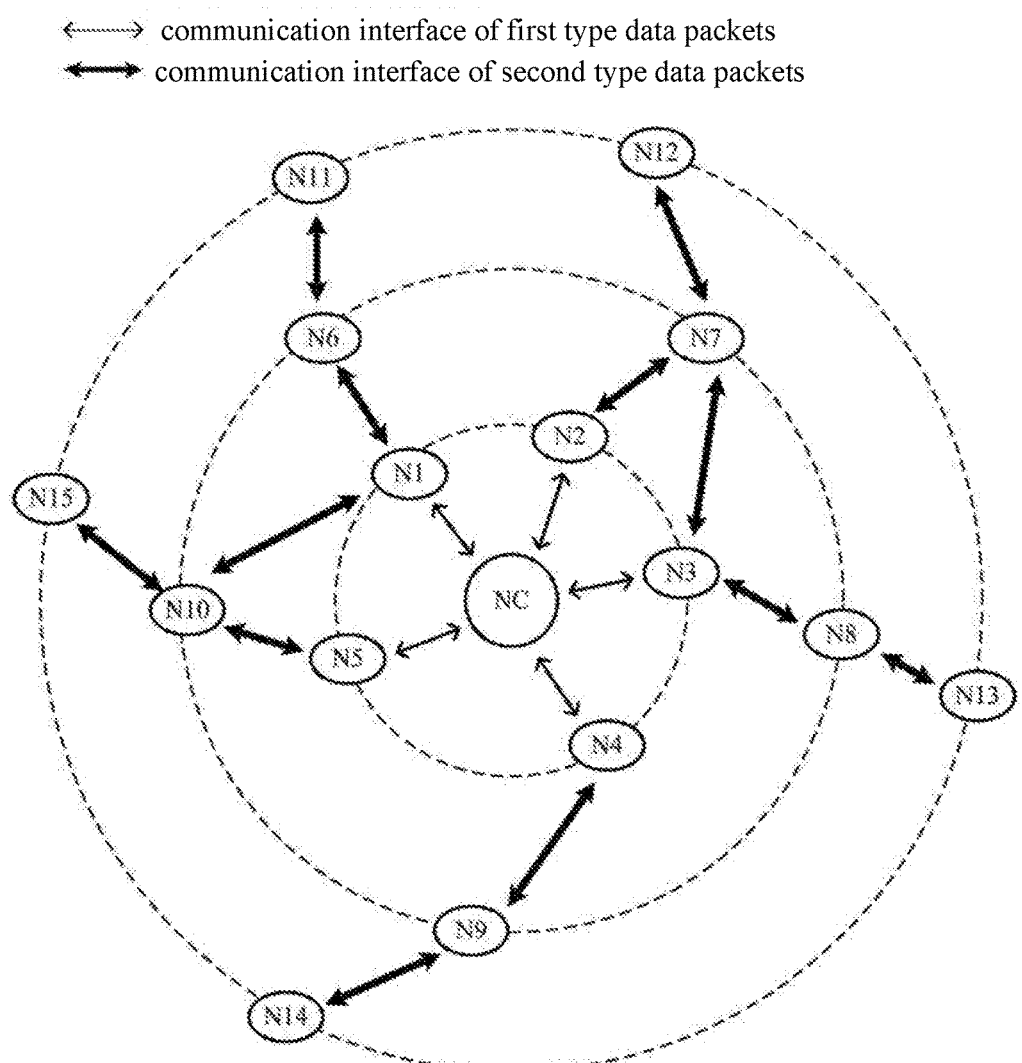
FIG. 4 is a schematic block diagram of an example network topology of a mesh network system, in accordance with embodiments of the present invention.

Referring now to FIG. 4, shown is a schematic block diagram of an example network topology of a mesh network system, in accordance with embodiments of the present invention. In this particular example, the mesh network system can include network controller NC and a plurality of node devices N1-N15. Here, the mesh network is a multi-path network. A plurality of signal paths can be provided with the center of network controller NC. Each signal path can include a plurality of node devices coupled in series, and node devices of different signal paths can be connected together.

With network controller NC as the center, node devices N1, N6, and N11 can be arranged in sequence on a first signal path, node devices N2, N7, and N12 can be arranged in sequence on a second signal path, node devices N3, N8, and N13 can be arranged in sequence on a third signal path, node devices N4, N9, and N14 can be arranged in sequence on a fourth signal path, and node devices N5, N10, and N15 can be arranged in sequence on a fifth signal path. The first to fifth signal paths may all be connected to network controller NC, and there may also be connections among any two of signal paths. For example, node device N1 of the first signal path can be connected to node device N10 of the fifth signal path, and node device N7 of the second signal path can be connected to node device N3 of the third signal path.

The data packets can be transmitted between two adjacent node devices of the same signal path, or between two adjacent node devices of different signal paths. The data packets of each node device can be transmitted to an adjacent node device or the network controller through different signal paths. For example, node devices N1-N5 are adjacent to network controller NC and can be operated in the first mode to connect to network controller NC through the standard BLE protocol. The other node devices may not be adjacent to network controller NC, and can communicate with adjacent node devices through a protocol with enhanced physical layer performance. Therefore, any one of the node devices of the mesh network system can communicate with network controller NC through one or more hops.

Figure 5:
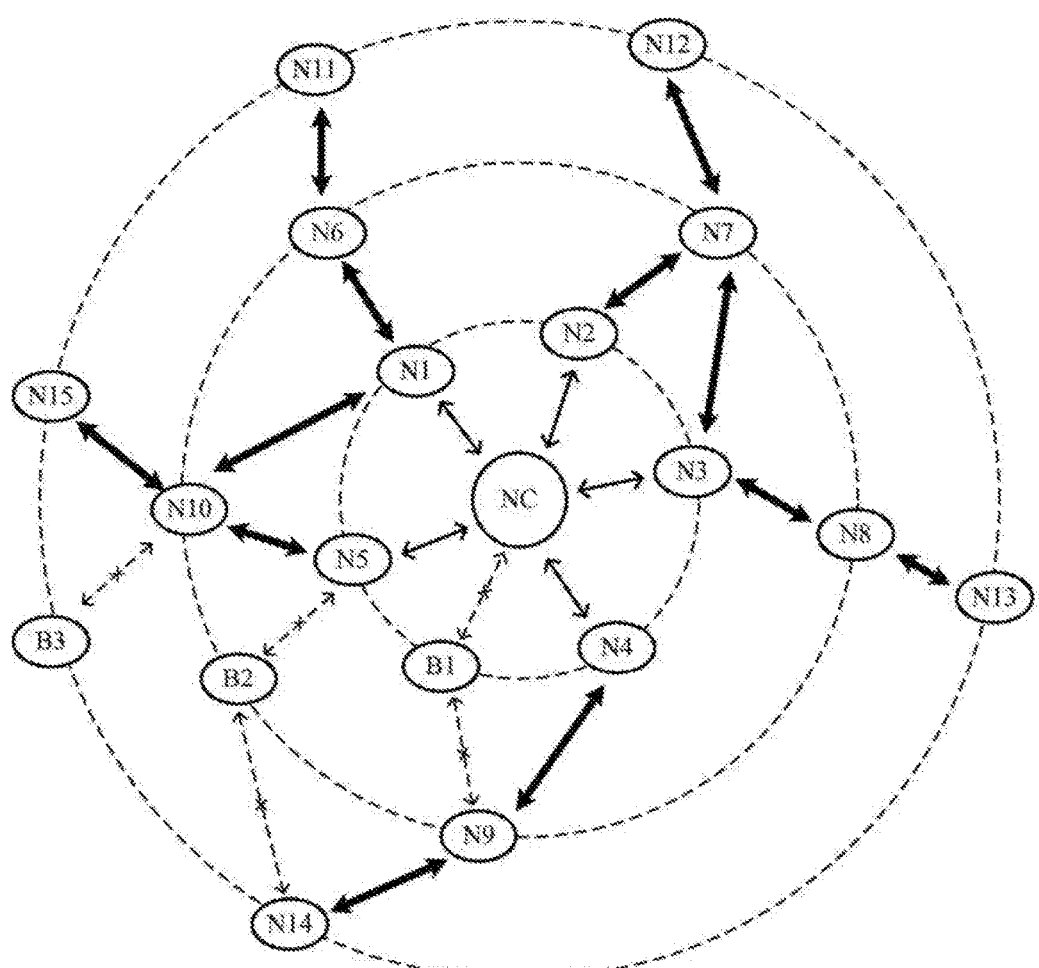
FIG. 5 is a schematic block diagram of an example network topology of the mesh network system of FIG. 4 when unexpected node device appears in the communication range of the mesh network system, in accordance with embodiments of the present invention.

Referring now to FIG. 5, shown is a schematic block diagram of an example network topology of the mesh network system of FIG. 4 when unexpected node device appears in the communication range of the mesh network system, in accordance with embodiments of the present invention. In this particular example, unexpected or unsecure BLE equipment/devices B1-B3 can appear in the mesh network and attempt unauthorized communication with network controller NC or node devices N1-N15. Because the communication among node devices may be based on transmission of data packets with enhanced physical layer performance, standard BLE equipment/devices B1-B3 may not be able to communicate with other node devices. Standard BLE equipment B1-B3 may not demodulate data packets of a node device, and standard BLE data packets may not be demodulated by node devices N6-N15.

Standard BLE data packets transmitted to network controller NC from node devices N1-N5 and transmitted to node devices N1-N5 from network controller NC may be compatible with a standard BLE protocol, and as such data packets can be received by BLE equipment B1-B3. However, the data packets may have a fixed format that may not be demodulated and processed above the level of physical layer by BLE equipment B1-B3. Thus, the standard BLE equipment B1-B3 may not be able to access the mesh network. In addition, node devices N1-N5 and network controller NC can also receive standard BLE data packets from BLE equipment. However, because of the format differences of the data packets, the data packets may be abandoned by node devices N1-N5 and network controller NC. Therefore, the interference caused by standard BLE equipment within the communication range of the mesh network system can be avoided in order to improve the security of the mesh network.

In particular embodiments, a node device can be operated in different modes. When the previous hop equipment is normal or approved equipment, the data packets of a predetermined physical layer protocol can be converted to data packets with enhanced physical layer performance, and then transmitted. When the next hop equipment is normal or approved equipment, data packets with enhanced physical layer performance may be converted to the data packets of a predetermined physical layer protocol, and then transmitted. When the previous and next node devices are of the same type, data packets with enhanced physical layer performance can be transmitted and received. Therefore, the mesh network/system of particular embodiments can be compatible with standard node devices, and the overall communication performance, stability, and communication range can be improved as a result.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. An apparatus, comprising:
   a) a network controller in a mesh network, and being configured to transmit and receive first type data packets;
   b) a plurality of node devices in said mesh network, wherein each node device is configured to operate in a first mode or a second mode;
   c) a node device of said plurality of node devices being configured to convert at least part of said first type data packets to second type data packets, and to then transmit said second type data packets, when said node device operates in said first mode;
   d) said node device being configured to convert at least part of said second type data packets to said first type data packets when said node device operates in said first mode; and
   e) said node device being configured to transmit and receive said second type data packets when said node device operates in said second mode, wherein said first type data packets are configured as data packets of a predetermined physical layer protocol, wherein said second type data packets are configured as data packets with an enhanced physical layer performance, wherein said first mode or said second mode of said node device is determined in accordance with a relative position of said node device to said network controller.

2. The apparatus of claim 1, wherein said node device operates in said second mode when said relative position is that said node device is not adjacent to said network controller.

3. The apparatus of claim 1, wherein said relative position is determined in accordance with the hops number of a shortest forwarding path between said node device and said network controller.

4. The apparatus of claim 1, wherein said node device operates in said first mode when said relative position is that said node device is adjacent to said network controller.

5. The apparatus of claim 1, wherein:
   a) said network controller is configured to generate command data packets;
   b) said command data packets are transmitted in a broadcast mode; and
   c) said relative position of said node device is determined in accordance with the minimum forwarding number when said command data packet is received.

6. The apparatus of claim 1, wherein said first mode or said second mode of said node device is determined in accordance with a state of an adjacent node device.

7. The apparatus of claim 1, wherein said first type data packet is configured as a data packet in accordance with a first modulation mode, and said second type data packet is configured as a data packet in accordance with a second modulation mode.

8. The apparatus of claim 7, wherein said second modulation mode has at least one of: a lower receiving sensitivity, a lower rate, and use of spreading spectrum technology, as compared with said first modulation mode.

9. The apparatus of claim 8, wherein:
   a) said first modulation mode comprises a 1 Mbps GFSK modulation mode; and
   b) said second modulation mode is selected from: 1 Mbps BPSK, 250 KHz GFSK, spreading spectrum BPS K, spreading spectrum GFSK, and spreading spectrum QPSK modulation modes.

10. A node device configured in a mesh network, the node device comprising:
   a) a multimode transceiver configured to transmit and receive first type data packets and second type data packets;
   b) a device controller configured to convert at least part of received first type data packets to said second type data packets that are then transmitted by said multimode transceiver, and being configured to convert at least part of received second type data packets to said first type data packets that are then transmitted by said multimode transceiver in a first mode, wherein said device controller is configured to control said multimode transceiver to transmit and receive said second type data packets in a second mode; and
   c) wherein said first type data packets are configured as data packets of a predetermined physical layer protocol, wherein said second type data packets are configured as data packets with enhanced physical layer performance, and wherein said device controller is configured to control said node device to operate in said first mode or said second mode in accordance with a relative position of said node device to a network controller in said mesh network.

11. The node device of claim 10, wherein said device controller is configured to control said node device to operate in said second mode when said relative position is that said node device is not adjacent to said network controller.

12. The node device of claim 10, wherein said relative position is determined in accordance with the hops number of a shortest forwarding path between said node device and said network controller.

13. The node device of claim 12, wherein:
   a) said relative position of said node device is determined in accordance with said shortest forwarding path when command data packets are received by said device controller; and
   b) said command data packets are generated by said network controller and transmitted in a broadcast mode.

14. The node device of claim 10, wherein said device controller operates in said first mode when said relative position is that said node device is adjacent to said network controller.

15. The node device of claim 10, wherein said first type data packets are data packets in accordance with a first modulation mode, and said second type data packets are data packets in accordance with a second modulation mode.

16. The node device of claim 15, wherein said second modulation mode has at least one of: a lower receiving sensitivity, a lower rate, and use of spreading spectrum technology, as compared with said first modulation mode.

17. The mesh network system of claim 16, wherein:
   a) said first modulation mode comprises a 1 Mbps GFSK modulation mode; and
   b) said second modulation mode is selected from: 1 Mbps BPSK, 250 KHz GFSK, spreading spectrum BPS K, spreading spectrum GFSK, and spreading spectrum QPSK modulation modes.

18. A method of forwarding a data packet from a node device in a mesh network, the method comprising:
   a) determining whether said node device operates in a first mode or a second mode in accordance with a relative position of said node device to a network controller in said mesh network;
   b) in said first mode, converting at least part of received first type data packets to second type data packets;
   c) transmitting said second type data packets;
   d) converting at least part of received second type data packets to said first type data packets;
   e) transmitting said first type data packets; and
   f) in said second mode, transmitting and receiving said second type data packets, wherein said first type data packets are configured as data packets of predetermined physical layer protocol, and said second type data packets are configured as data packets with enhanced physical layer performance.

19. The method of claim 18, wherein said determining whether said node device operates in said first mode or said second mode comprises:
   a) determining that said node device operates in said first mode when said relative position is that said node device is adjacent to said network controller; and
   b) determining that said node device operates in said second mode when said relative position is that said node device is not adjacent to said network controller.

20. The method of claim 19, further comprising determining said relative position in accordance with the hops number of a shortest forwarding path between said node device and said network controller of said mesh network.

* * * * *